(12) United States Patent
Tachibana et al.

(10) Patent No.: US 8,013,896 B2
(45) Date of Patent: Sep. 6, 2011

(54) IMAGING APPARATUS INCLUDING SHAKING CORRECTION FOR A SECOND IMAGING SENSOR

(75) Inventors: Hiroshi Tachibana, Osaka (JP); Nobuharu Murashima, Nara (JP); Ichiro Tsujimura, Osaka (JP); Genta Yagyu, Hyogo (JP); Kazuhiko Kojima, Osaka (JP)

(73) Assignee: Sony Corporation, Tokyo (JP)

( * ) Notice: Subject to any disclaimer, the term of this patent is extended or adjusted under 35 U.S.C. 154(b) by 661 days.

(21) Appl. No.: 12/049,745

(22) Filed: Mar. 17, 2008

(65) Prior Publication Data

US 2008/0266405 A1 Oct. 30, 2008

(30) Foreign Application Priority Data

Apr. 24, 2007 (JP) ................... 2007-113996

(51) Int. Cl.
*H04N 5/228* (2006.01)
*H04N 5/222* (2006.01)
(52) U.S. Cl. ............ 348/208.5; 348/333.03; 348/333.08
(58) Field of Classification Search ............ 348/208.99, 348/208.2, 208.4–208.8, 208.11, 333.01, 348/333.03, 333.08–333.1; 396/52–55, 373–4
See application file for complete search history.

(56) References Cited

U.S. PATENT DOCUMENTS

| 7,324,748 | B2* | 1/2008 | Abe et al. ................... 396/55 |
| 7,656,454 | B2* | 2/2010 | Kojima ....................... 348/344 |
| 7,734,170 | B2* | 6/2010 | Yagyu et al. ................ 396/386 |
| 7,748,914 | B2* | 7/2010 | Nagata ........................ 396/354 |
| 2004/0201764 | A1* | 10/2004 | Honda et al. ........... 348/333.01 |

FOREIGN PATENT DOCUMENTS

| JP | 2001-133846 | 5/2001 |
| JP | 2006-178045 | 7/2006 |

* cited by examiner

*Primary Examiner* — Sinh Tran
*Assistant Examiner* — Daniel M Pasiewicz
(74) *Attorney, Agent, or Firm* — Oblon, Spivak, McClelland, Maier & Neustadt, L.L.P.

(57) ABSTRACT

An imaging apparatus includes a first imaging sensor, a second imaging sensor, a display unit, an electronic viewfinder unit, a position changing unit and a sensor-shift shaking correction unit. The first imaging sensor acquires an image relating to a subject at the time of main photography. The second imaging sensor acquires an image relating to the subject before the time of main photography. The sensor-shift shaking correction unit performs shaking correction at the time of the main photography, by changing a position of the first sensor with the position changing unit. The electronic viewfinder unit performs consecutive image display on a display screen of the display unit, based on images sequentially acquired by the second imaging sensor before the main photography, and includes an electronic shaking correction unit that performs shaking correction of the consecutive image display, by changing the display position of the images on the display screen.

10 Claims, 7 Drawing Sheets

IMAGING APPARATUS INCLUDING SHAKING CORRECTION FOR A SECOND IMAGING SENSOR

CROSS REFERENCES TO RELATED APPLICATIONS

The present invention contains subject matter related to Japanese Patent Application JP 2007-113996 filed in the Japanese Patent Office on Apr. 26, 2007, the entire contents of which are incorporated herein by reference.

BACKGROUND OF THE INVENTION

1. Field of the Invention

The present invention relates to an imaging apparatus having two imaging sensor for generating image signals relating to a subject.

2. Description of the Related Art

There are imaging apparatuses configured as digital cameras or the like, wherein shaking correction (sensor-based shaking correction) at the time of main photography can be performed by shifting the position of an imaging device (imaging device for main photography) which acquires a main photography image, i.e., recording image (see Japanese Unexamined Patent Application Publication No. 2006-178045).

On the other hand, there are imaging apparatuses having an electronic viewfinder in addition to an optical viewfinder, whereby a live view image of the subject can be displayed on an LCD monitor prior to the main photography, as with the single-lens reflect camera disclosed in Japanese Unexamined Patent Application Publication No. 2001-133846, for example. With the imaging apparatus in this Japanese Unexamined Patent Application Publication No. 2001-133846, a subject light image which has passes through the photography lens is guided to a viewfinder window or live view imaging device by driving a mirror provided so as to be capable of advancing/retreating to and from the optical path, whereby the optical viewfinder and electronic viewfinder can be switched over.

SUMMARY OF THE INVENTION

However, with the imaging apparatus disclosed in Japanese Unexamined Patent Application Publication No. 2001-133846, shaking correction cannot be performed with regard to the imaging device used for live view, so any shaking of the hands for example results in blurring of the subject in the live view display. Note that while applying the sensor shift type shaking correction disclosed in Japanese Unexamined Patent Application Publication No. 2006-178045 to the imaging apparatus disclosed in disclosed in Japanese Unexamined Patent Application Publication No. 2001-133846 does allow shaking of the main photography imaging device to be corrected, no correction is performed on the live view imaging device, meaning that the subject blurs in the consecutive image display (live view display) when using the electronic viewfinder.

There has been recognized the need to provide an imaging apparatus wherein appropriate shaking correction can be performed in consecutive image display when using the electronic viewfinder.

An imaging apparatus according to an embodiment of the present invention includes: a first imaging sensor configured to acquire an image relating to a subject at the time of main photography; a second imaging sensor configured to acquire an image relating to a subject before the time of main photography; a display unit having a display screen capable of image display; an electronic viewfinder unit configured to perform consecutive image display on the display screen, based on images sequentially acquired by the second imaging sensor before the main photography; a position changing unit configured to change the position of the first imaging sensor; and a sensor-shift shaking correction unit configured to perform shaking correction at the time of the main photography, by changing the position of the first sensor with the position changing unit; the electronic viewfinder unit further including an electronic shaking correction unit configured to perform shaking correction of the consecutive image display, by changing the display position of the images on the display screen.

According to this configuration, shaking correction at the time of main photography can be performed by changing the position of the first imaging sensor, and electronic shaking correction in consecutive image display can be performed at the electronic viewfinder unit for performing consecutive image display on the display screen of the display unit, based on the images sequentially acquired by the second imaging sensor before main photography. As a result, appropriate shaking correction can be performed in consecutive image display when using the electronic viewfinder.

DESCRIPTION OF THE PREFERRED EMBODIMENTS

Figure 1:
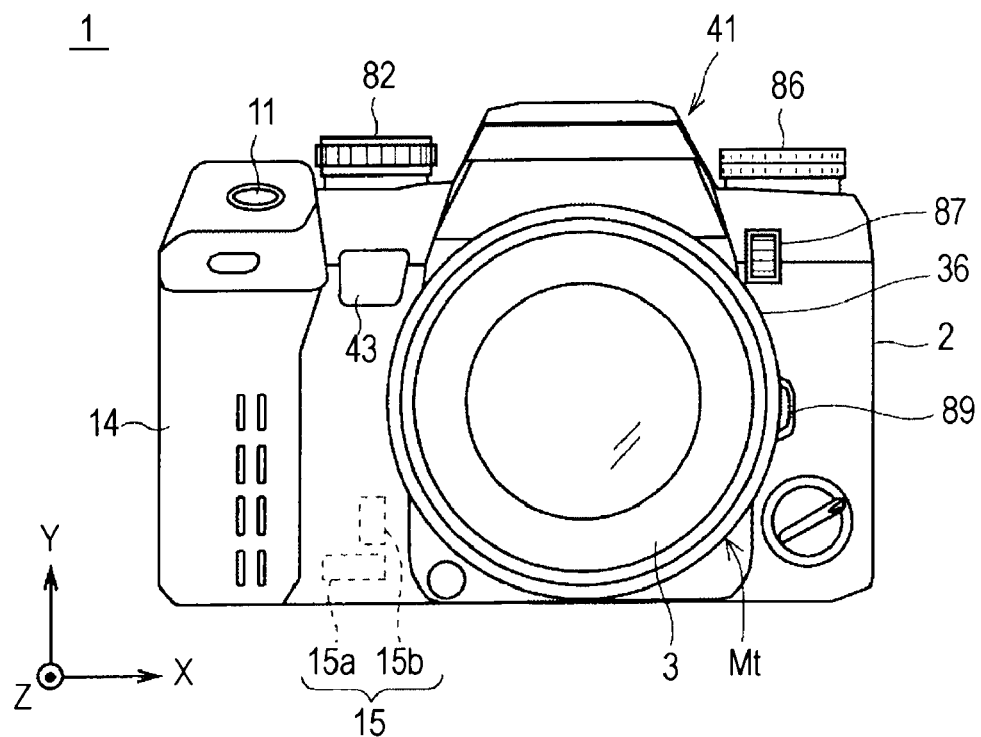
FIG. 1 is a frontal perspective view of an imaging apparatus 1 according to an embodiment of the present invention.
Figure 2:
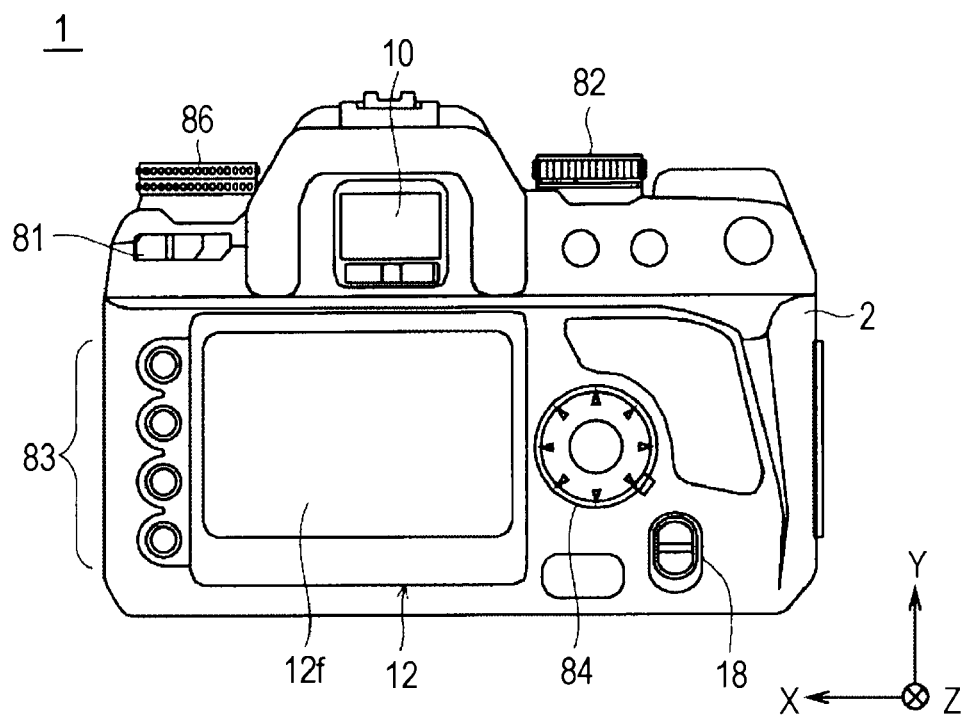
FIG. 2 is a rear perspective view of the imaging apparatus 1.

FIGS. 1 and 2 are diagrams illustrating an external configuration of an imaging apparatus 1 according to an embodiment of the present invention, wherein FIG. 1 is a frontal view thereof, and FIG. 2 is a rear view thereof. The imaging apparatus 1 is configured as a single-lens reflex type digital camera with interchangeable lenses.

As shown in FIG. 1, the imaging apparatus 1 has a camera main unit (camera body) 2. An interchangeable photography lens unit (interchangeable lens) 3 is detachably mounted to the camera main unit 2. The photography lens unit 3 is primarily includes a lens barrel 36, and a photography optical system 37 (see FIGS. 3 through 5) configured of a lens group disposed within the lens barrel 36, an aperture 16 (see FIG. 3) and so forth. The lens group 37 includes a focusing lens which changes the focal position by moving along the optical axis.

The cameral main unit 2 has provided, at the generally center portion of the front face thereof, a ring-shaped mount portion Mt to which the photography lens unit 3 is mounted, and a release button 89 for detaching the photography lens unit 3 provided near the ring-shaped mount portion Mt.

Also, the camera main unit 2 has a mode setting dial 82 provided on the upper left portion of the front face thereof, and a control value setting dial 86 provided on the upper right portion of the front face thereof. Operating the mode setting dial 82 allows the user to perform setting operations (switch-over operations) of various photography modes (portrait photography mode, scenery photography mode, full-auto photography mode, etc.), playback modes for playing back images that have been taken, communication modes by which to exchange data with external devices, and so on). Operating the control value setting dial 86 allows the user to set control values for the various photography modes.

Further, the camera main unit 2 has a grip 14 on the left end portion of the front face for the photographer to grip. A release button 11 for instructing starting of exposure is provided on the upper face of the grip 14. A battery storage chamber and card storage chamber are provided within the grip 14 with four AA batteries for example being stored as the power source of the camera, and a memory card 90 (see FIG. 3) being detachably stored in the card storage chamber for recording image data.

The release button 11 is a two-stage detection button capable of detecting two stages, one being a half-pressed state (S1 state) and a full-pressed state (S2 state). Upon the release button 11 being half-pressed and entering the S1 state, preparatory operations (e.g., AF control operations, AE control operations, etc.) are made for acquiring a still image of the subject for recording (i.e., a main photography image). Also, upon the release button 11 being further pressed and entering the S2 state, photography operations of the main photography image (a series of operations wherein exposure operations relating to the subject (light image of the subject) are performed using an imaging device 5, which will be described later, and image signals obtained by the exposure operations are subjected to predetermined image processing) are executed.

Also, as indicated by the dotted lines in FIG. 1, a shaking detection sensor 15 for detecting shaking of the imaging apparatus 1 is installed in the camera main unit 2. This shaking detection sensor 15 detects shaking applied to the imaging apparatus 1 (camera main unit 2) by shaking of the hands or the like, and has a pitch direction sensor 15a for detecting camera shaking in the pitch direction and a yaw direction sensor 15b for detecting camera shaking in the yaw direction. In FIG. 1, we will say that the horizontal direction is the X-axial direction (pitch direction) and the direction perpendicular to the pitch direction is the Y-axial direction (yaw direction). The pitch direction sensor 15a and the yaw direction sensor 15b are configured of gyros (angular velocity sensors), and can detect the angular velocity of shaking in each direction. A shaking detection sensor 15 configured thus is used with both later-described sensor-shifting shaking correction and electronic shaking correction.

Figure 4:
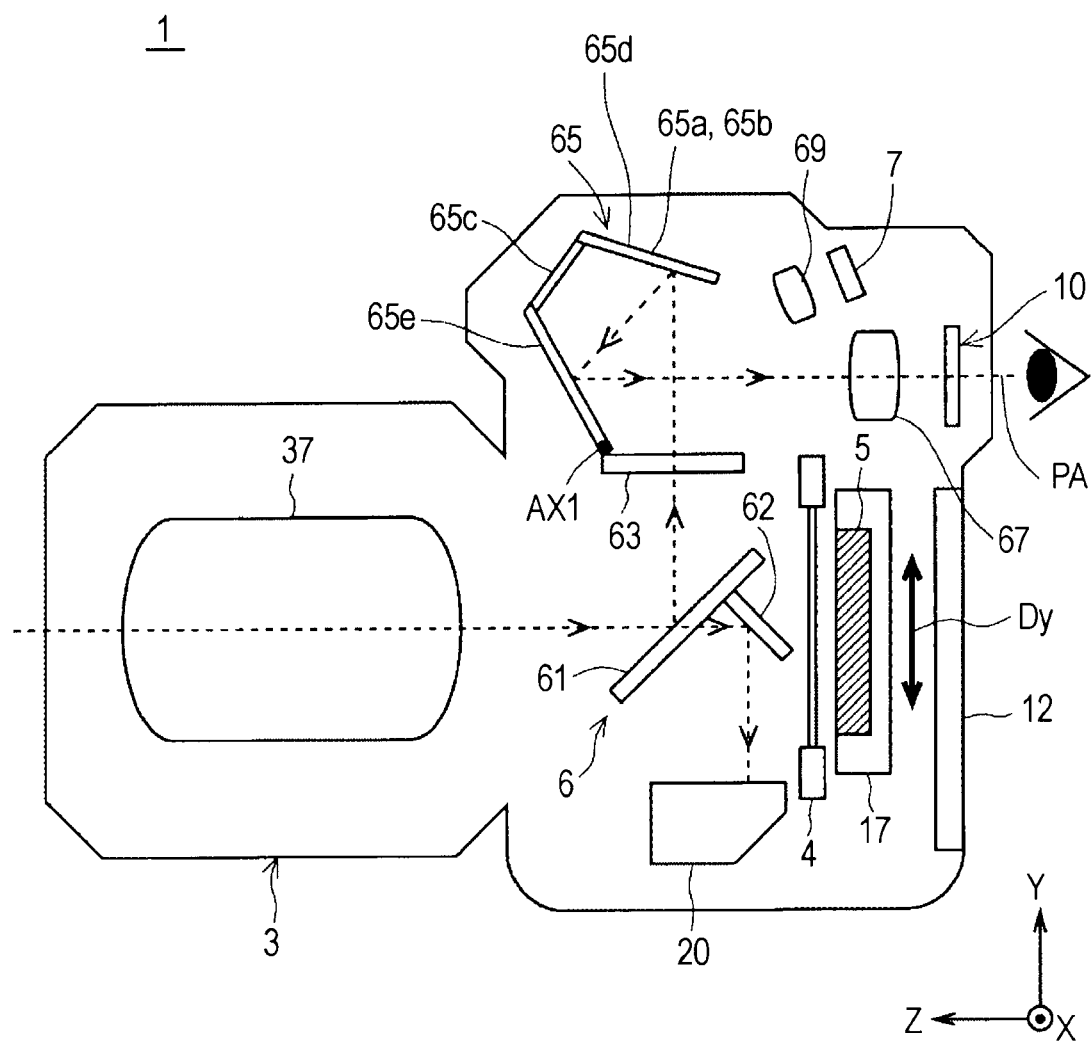
FIG. 4 is a cross-sectional diagram illustrating composition determining operations with an optical viewfinder.

In FIG. 2, a viewfinder window (eyepiece) 10 is provided above the generally center portion on the rear face of the camera main unit 2. The photographer can visually recognize a light image of the subject optically guided in from the photography lens unit 3 as shown in FIG. 4 by looking through the viewfinder window 10, to compose the picture. That is to say, the photographer can compose the picture using an optical viewfinder, wherein the subject light image passes through the photography lens unit 3 to the viewfinder window 10.

Note that with the imaging apparatus 1 according to the present embodiment, the picture can be composed using a live view function wherein a live view image (preview image) of the subject image before the main photography is displayed on the back monitor 12, as described in detail later. This live view function is a function wherein a time-series of images of the subject, acquired with an imaging device 7 (see FIG. 4) is displayed sequentially on the back monitor 12. In other words, images of the subject are displayed on the back monitor 12 as if they were a moving image. Switching between composing of a picture using the above live view function (electronic viewfinder) and composing of a picture using the optical viewfinder is performed by the photographer rotating a switchover dial 87 to be described later.

In FIG. 2, at the generally center portion of the rear face of the camera main unit 2 is provided a back monitor 12 having a display screen 12f capable of displaying images. The back monitor 12 is configured of a color liquid crystal display (LCD), for example. The back monitor 12 can display a menu screen for setting photography conditions and so forth, displaying reproduced photography images recorded in the memory card 90 in playback mode, and so forth.

A main switch 81 is provided on the upper left portion of the back monitor 12. The main switch 81 is configured of a two-point slide switch, with the power source being turned off upon the contact point being set to the "OFF" position at the left side, and the power source being turned on upon the contact point being set to the "ON" position at the right side.

A direction selection key 84 is provided to the right side of the back monitor 12. The direction selection key 84 has a circular operation button, capable of detection of operations in each of the two vertical directions (up, down), the two horizontal directions (left, right), and the four diagonal directions (upper left, upper right, lower left, lower right). The direction selection key 84 is also capable of detecting, in addition to pressing operations in the above eight directions, pressing operations of a center push button.

A shaking correction switch 18 is provided to the lower right of the direction selection key 84. This shaking correction switch 18 is a button for providing a later-describing shaking correction unit 17 with operation signals so as to causing the shaking correction unit 17 to perform shaking correction operations. The shaking correction switch 18 is operated by the user in cases that there may be effects of shaking such as shaking of the hands, examples thereof being when the camera is being held in the hand, when performing telescopic photography, when performing photograph in dark situations or for longer exposures, whereby the shaking correction operations of the imaging apparatus 1 are actuated.

Provided on the left side of the back monitor 12 is a setting button group 83 made up of multiple buttons for setting menu screens, deleting images, and so forth.

Figure 3:
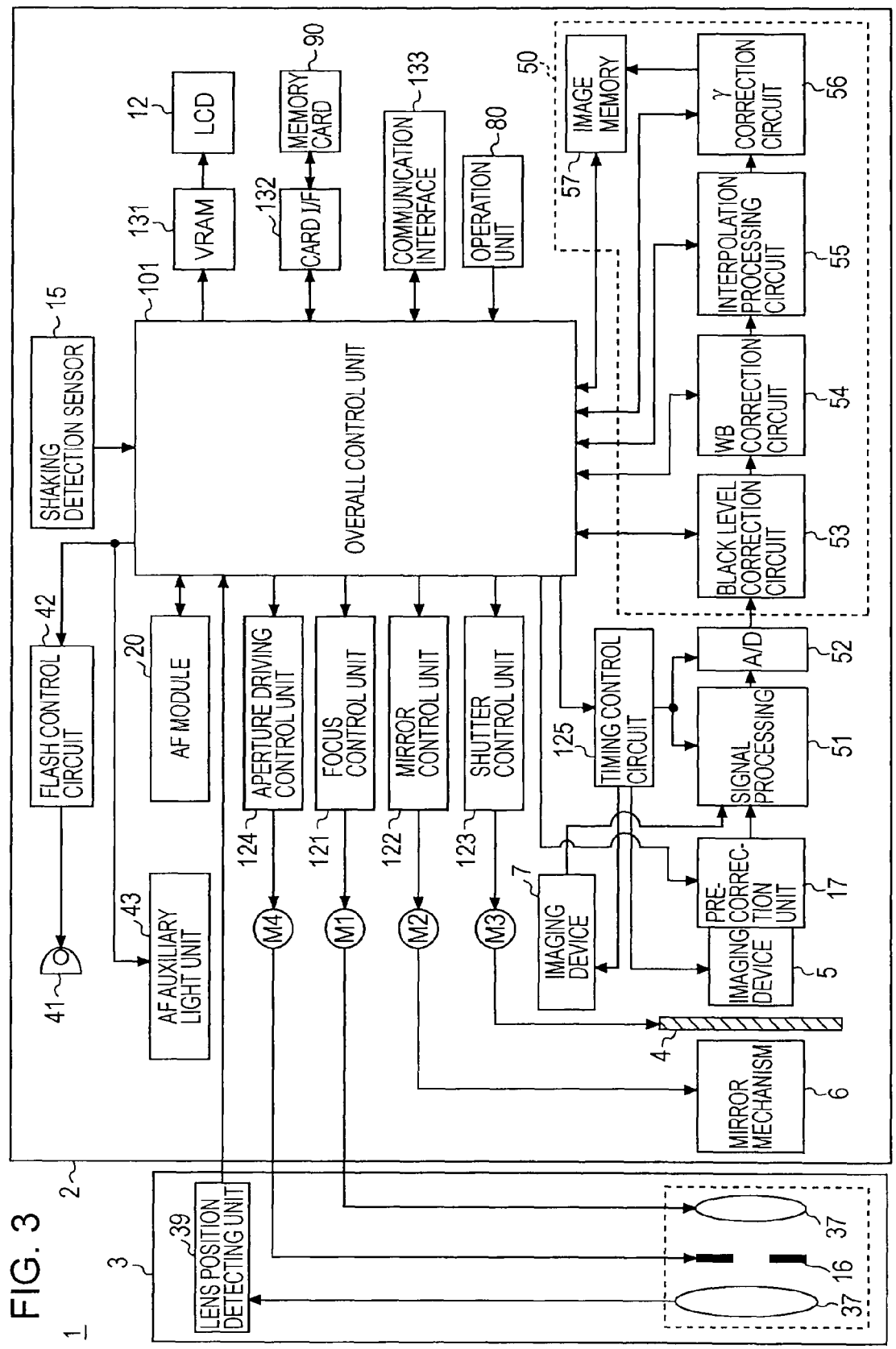
FIG. 3 is a block diagram illustrating the function a1 configuration of the imaging apparatus 1.

Next, an overview of functions of the imaging apparatus 1 will be described with reference to FIG. 3. FIG. 3 is a block diagram illustrating the functional configuration of the imaging apparatus 1.

As shown in FIG. 3, the imaging apparatus 1 has an operating unit 80, central control unit 101, focus control unit 121, mirror control unit 122, shutter control unit 123, aperture driving control unit 124, timing control unit 125, digital signal processing circuit 50, and so forth.

The operating unit 80 is configured of various buttons including the release button 11 (see FIG. 1), various switches, and so forth. The central control unit 101 responds to input operations made by the photographer at the operating unit 80 so as to realize the various actions thereof.

The central control unit 101 is configured as a microcomputer, having primarily a CPU, RAM, ROM, and so forth. The central control unit 101 reads out programs stored within the ROM, and realizes the functions thereof by executing the program at the CPU. For example, the central control unit 101 acts cooperatively with an AF module 20 and focus control unit 121 and so forth to perform focusing control operations wherein the position of the focus lens is controlled. Note that the AF module 20 is capable of detecting the focusing state of the subject by a focusing state detection technique such as phase-contrast or the like, using the light from the subject that has been guided by a mirror mechanism 6.

The focus control unit 121 moves a focus lens included in a lens group 37 of the photography lens unit 3 by generating control signals based on signals input from the central control unit 101 and driving a motor M1. The position of the focus lens is detected by a lens position detecting unit 39 of the photography lens unit 3, and data indicating the position of the focus lens is sent to the central control unit 101. Thus, the focus control unit 121, central control unit 101, and so forth, control movement of the focus lens along the optical axis.

The mirror control unit 122 controls state switchover between a state wherein the mirror mechanism 6 is retracted from the optical path 6 (mirror-up state) and a state wherein the mirror mechanism 6 shields the optical path 6 (mirror-down state). The mirror control unit 122 switches over between the mirror-up state and the mirror-down state by generating control signals based on signals input from the central control unit 101 and driving a motor M2.

The shutter control unit 123 controls opening and closing of a shutter 4 by generating control signals based on signals input from the central control unit 101 and driving a motor M3.

The aperture driving control unit 124 controls the aperture diameter of the aperture 16 provided to the photography lens unit 3 by generating control signals based on signals input from the central control unit 101 and driving a motor M4.

The timing control circuit 125 performs timing control of an imaging device 5 and so forth. The main imaging device 5 (e.g., a CMOS sensor) converts the subject light image received via the lens group 37 into electrical signals by photo-electrical conversion, and generates image signals relating to the main photography image (image signals for recording). That is to say, the imaging device 5 serves as an imaging sensor (first imaging sensor) for acquiring an image relating to the subject at the time of main photography.

In response to driving control signals (accumulation start signals and accumulation end signals) input from the timing control circuit 125, the imaging device 5 performs exposure (charge accumulation by photo-electrical conversion) of the subject image formed on the reception face thereof, so as to generate image signals relating to the subject image. Also, in response to read control signals input from the timing control circuit 125, the imaging device 5 outputs the image signals to a signal processing unit 51. Timing signals (synchronizing signals) from the timing control circuit 125 are also input to the signal processing unit 51 and to an A/D (analog/digital) conversion circuit 52.

The imaging device 5 is held is as to be movable two-dimensionally in a plane orthogonal to the optical axis of the photography lens unit 3, by way of a shaking correction unit 17. Specifically, the position of the imaging device 5 can be changed in a direction Dy parallel to the Y axial direction (see FIG. 4) and a direction Dx parallel to the X axial direction by a yaw-direction actuator and a pitch-direction actuator (not shown) provided to the shaking correction unit 17.

In a case wherein the shaking correction switch 18 is operated and the shaking correction mode is to be executed, the central control unit 101 calculates the shaking direction and shaking amount based on shaking detection signals from the aforementioned shaking detection sensor 15, correction control signals are generated based on the calculated direction and amount of shaking which are output to the shaking correction unit 17, and the imaging device 5 is driven so as to be shifted in a direction whereby shaking is cancelled out.

With a case of performing servo control as an example, angular velocity signals detected by the shaking correction sensor 15 are integrated to obtain the deflection amount (deflection angle θ) in each direction, whereby the moving distance δ1 (wherein δ1=f·tan θ) of the imaging device 5 corresponding to the deflection angle θ, is calculated, in accordance with the lens profile of the photography lens unit 3, such as focal distance f, and so forth. Position information δ2 of the imaging device 5 is then obtained from an unshown position detection sensor for example, and driving signals for driving the imaging device such that $$\delta 1 - \delta 2 = 0$$

are generated and transmitted to the shaking correction unit 17.

The image signals acquired at the imaging device 5 are subjected to analog signal processing at the signal processing unit 51, and the image signals following the analog signal processing are converted into digital image data (image data) by the A/D conversion circuit 52. The image data is input to the digital signal processing circuit 50.

The digital signal processing circuit 50 subjects the image data input from the A/D conversion circuit 52 to digital signal processing, and generates image data relating to the imaged image. The digital signal processing circuit 50 has a black level correction circuit 53, WB correction circuit 54, interpolation processing circuit 55, γ correction circuit 56, and image memory 57.

Figure 7A:
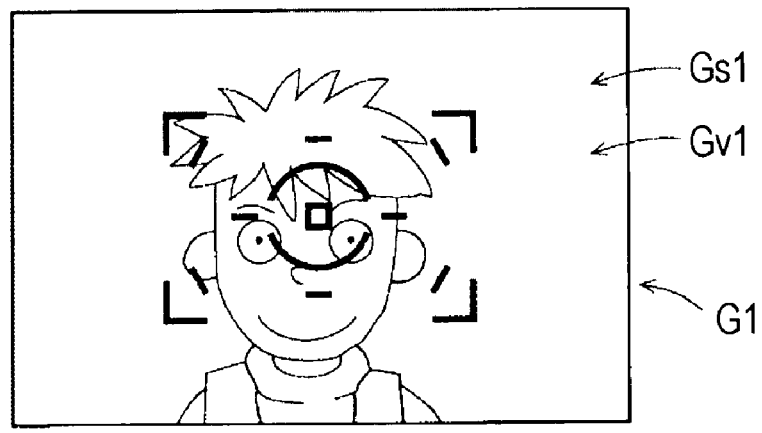
FIGS. 7A through 7C are diagrams for describing processing in electronic shaking correction.

The black level correction circuit 53 corrects the black level of each pixel data making up the image data output from the A/D conversion circuit 52 to a standard black level. The WB circuit 54 adjusts the white balance of the image. The interpolation processing circuit 55 erases a line image Gv1 (FIG. 7A), within the imaged image displayed on the back monitor 12 at the time of using shaking correction with the electronic viewfinder which will be described later, by interpolation processing. The γ correction circuit 56 performs gradient conversion of the imaged image. The image memory 57 is image memory capable of high-speed access, for temporarily storing the generated image data, and has capacity sufficient for storing multiple frames of image data.

At the time of main photography, the image data temporarily stored in the image memory 57 is subjected to image processing (compression processing, etc.) at the central control unit 101 as appropriate, and then is stored in the memory card 90 via the card interface 132.

Also, the image data temporarily stored in the image memory 57 is transferred to VRAM 131 as appropriate by the central control unit 101, and an image based on the image data is displayed on the back monitor 12. Thus, a confirmation display (after view) for confirming the photographed image, and a playback display for reproducing images photographed in the past, is realized.

Also, the imaging apparatus 1 further has an imaging device 7 in addition to the imaging device 5. The imaging device 7 functions as an imaging sensor (second imaging sensor) to acquire images of the subject prior to the main photography, serving as an imaging device for acquisition of the so-called live view images (i.e., as an electronic viewfinder imaging device).

The imaging device 7 has a configuration similar to that of the imaging device 5. Note, however, that the imaging device 7 only needs to have resolution sufficient for generating live view image signals (moving image signals), and normally is configured with fewer pixels than the imaging device 5.

The image signals acquired at the imaging device 7 are subjected to the same signal processing as the image signals acquired at the imaging device 5. That is to say, the image signals acquired at the imaging device 7 are subjected to analog signal processing at the signal processing unit 51, and are converted into digital image data by the A/D conversion circuit 52, then input to the digital signal processing circuit 50, and stored in the image memory 57.

Also, the time-sequence acquired at the imaging device 7 and stored in the image memory 57 is transferred to VRAM 131 as appropriate by the central control unit 101, and images based on the time-sequence image data are displayed on the back monitor 12. Thus, a display (live view) for composing the picture is realized.

Further, the imaging apparatus 1 has a communication interface 133, whereby the imaging apparatus 1 is capable of data communication with a device (e.g., a personal computer) with which it is connected.

Also, the imaging apparatus 1 has a flash 41, flash control circuit 42, and AF auxiliary light 43. The flash 41 is a light source used when the brightness of the subject is insufficient, or the like. Whether or not the flash is lit, and if lit, for how long, is determined by the flash control circuit 42 and the central control unit 101 and so forth. The AF auxiliary light 43 is an auxiliary light source for AF. Whether or not the AF auxiliary light 43 is lit, and if lit, for how long, is determined by the central control unit 101 and so forth.

Composition Determining Operations with the Imaging Apparatus 1 (Framing Operations)

Next, photography operations including composition determining operations with the imaging apparatus 1 will be described. As described above, with the imaging apparatus 1, pictures can be composed (framing) using the optical viewfinder (abbreviated as "OVF"), or using the electronic viewfinder (abbreviated as "EVF") wherein continuous image display (live view) based on images sequentially acquired at the imaging device 7 before main photography is performed on the display screen 12*f*. With the imaging apparatus 1, the photographer can select whether to compose pictures using the optical viewfinder or to compose pictures using the electronic viewfinder by operating the switchover dial 87.

Figure 5:
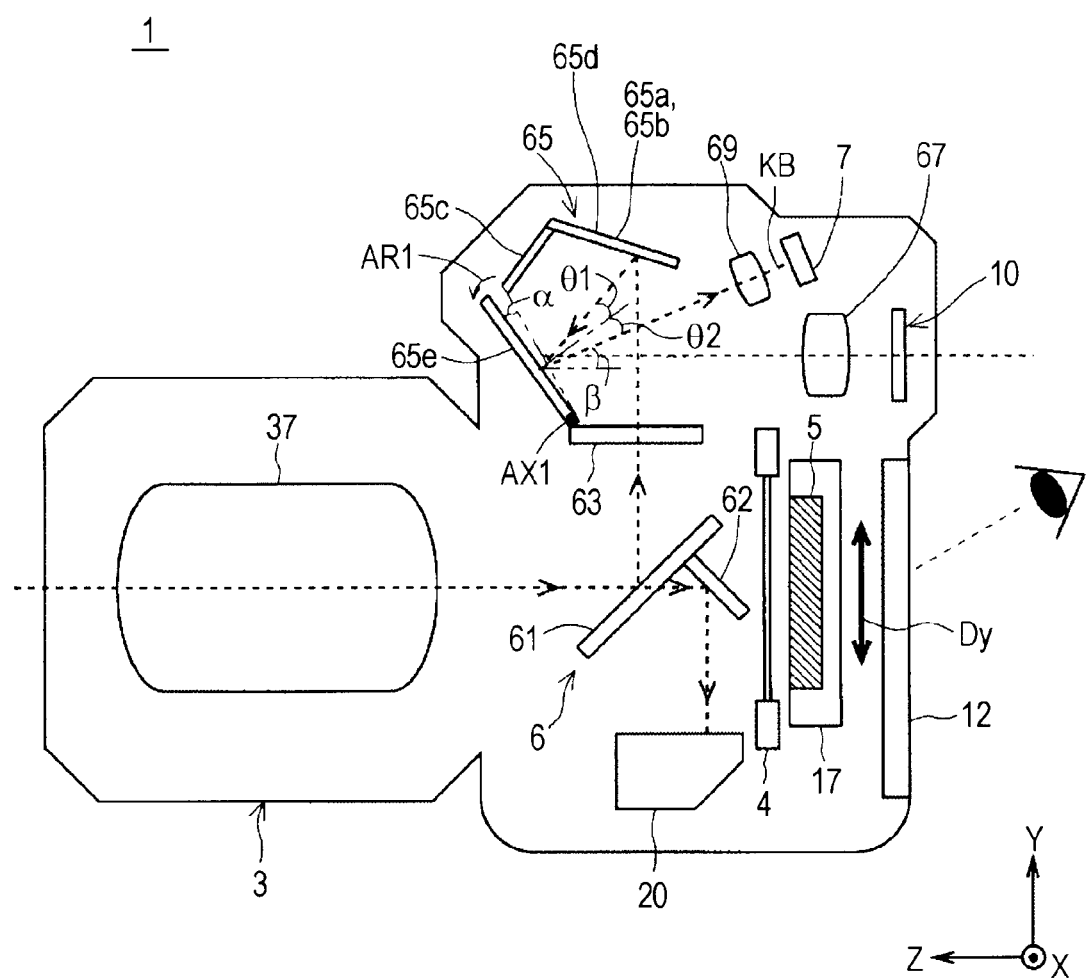
FIG. 5 is a cross-sectional diagram illustrating composition determining operations with an electronic viewfinder.

FIGS. 4 and 5 are cross-sectional view of the imaging apparatus 1, wherein FIG. 4 illustrates composition determining operations using the optical viewfinder, and FIG. 5 illustrates composition determining operations using the electronic viewfinder.

As shown in FIG. 4, the mirror mechanism 6 is provided on the optical path (photography optical path) from the photography lens unit 3 to the imaging device 5. The mirror mechanism 6 has a main mirror 61 (main reflecting face) for reflecting light from the photography optical system upwards. Part or all of the main mirror 61 is configured as a half mirror, transmitting a part of the light from the photography optical system. Also, the mirror configuration 6 also has a sub mirror 62 (sub reflecting face) for reflecting light which has transmitting the main mirror 61 downwards. The light reflected downwards by the sub mirror 62 is guided to the AF module 20 and input, and is used for phase-contrast AF operations.

In the photography mode, the mirror configuration 6 is placed in the mirror-down state until the release button 11 goes to the full-pressed state S2, i.e., remains in the mirror-down state while the photographer is determining composition (see FIGS. 4 and 5). The subject image from the photography lens unit 3 at this time is reflected upwards from the main mirror 6 and is input to a pentaprism mirror 65 as an observation light flux. The pentaprism mirror 65 has multiple mirrors (reflecting faces), and functions to adjust the orientation of the subject image. The path of the observation light flux after entering the pentaprism mirror 65 depends on which of the above methods (i.e., optical viewfinder or electronic viewfinder) is used to compose the picture, which will be described later, and the picture can be composed with the method which the photographer has selected.

On the other hand, upon the release button 11 being full-pressed that the state going to state S2, the mirror mechanism 6 is driven to the mirror-up state, and exposure operations start. Operations for acquiring the recording still image (also called "main photography image") of the subject (i.e., operations at the time of exposure) are the same regarding which of the above methods (i.e., optical viewfinder or electronic viewfinder) has been used to compose the picture.

Description will now be made regarding the operations in each of the methods used to compose the picture.

Composition Determining Operations with Optical Viewfinder

First, description will be made regarding composition determining operations using the optical viewfinder.

As shown in FIG. 4, the main mirror 61 and sub mirror 62 of the mirror mechanism 6 are placed on the optical path of the subject image from the photography lens unit 3, whereupon the subject is guided to the viewfinder window 10 by the main mirror 61 and pentaprism mirror 65 and eyepiece lens 67. Thus, the viewfinder optical system including the main mirror 61 and pentaprism mirror 65 and eyepiece lens 67 is capable of guiding the observation light flux, which is a light flux from the photography optical system and has been reflected off of the main mirror 61, to the viewfinder window 10. In other words, the optical viewfinder is capable of guiding a subject image which has passed through the photography lens to the viewfinder window 10, following the optical path PA (the dotted line portions in FIG. 4).

In more detail, light from the photography lens unit 3 is reflected at the main mirror 61 so that the path thereof changes upwards, is imaged on an focusing plate 63, and passes through the focusing plate 63. The light which has passed through the focusing plate 63 then further changes the path thereof at the pentaprism mirror 65, then further passes through the eyepiece lens 67 and heads toward the viewfinder window 10 (optical path PA in FIG. 4). The subject image which has passed through the viewfinder window 10 is visually recognized by the photographer (observer), that is to say, the photographer can confirm the subject image by looking into the viewfinder window 10.

Now, pentaprism mirror 65 is two mirror faces 65*a* and 65*b* formed in a shape like a triangular roof, known as a "roof mirror" or "Dach Mirror", a face 65*c* fixed as to the roof-shaped faces 65*a* and 65*b*, and a further mirror (reflecting face) 65*e*. Also, the two mirror faces 65*a* and 65*b* formed in a shape like a triangular roof are integrally formed by plastic molding, as a single article 65*d*. Light which has been reflected off of the main mirror 61 and has changed the path thereof upwards is reflected at the roof mirror 65*a* and 65*b* and horizontally inverted, and is also vertically inverted by being reflected off of the mirror 65*e*, and it is in this state that the light image reaches the eye of the photographer. The light image is horizontally and vertically inverted by the photography lens unit 3, and further horizontally and vertically inverted by the pentaprism mirror 65. Thus, the photographer can observe the subject image which is aligned so as to be vertically and horizontally the same as with the actual subject, in the viewfinder window 10.

Figure 6:
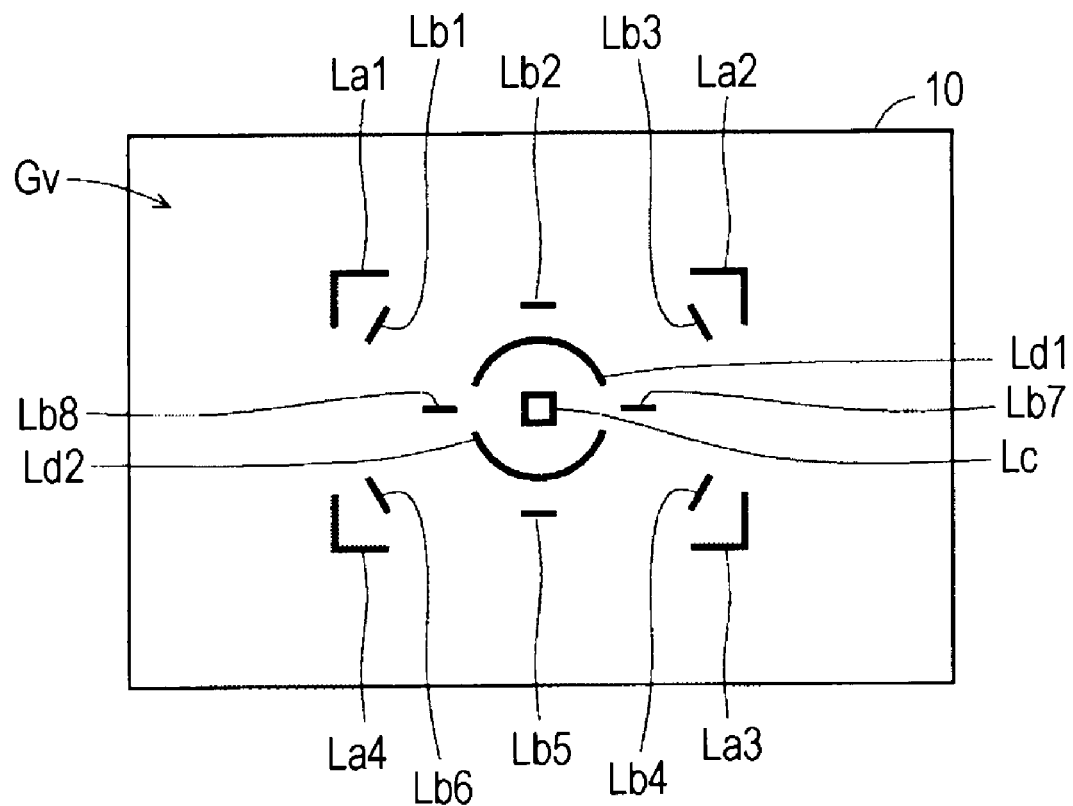
FIG. 6 is a diagram illustrating a line image Gv shown in a viewfinder window 10.

Also, with the optical viewfinder, the line image (line drawing) Gv (heavy lines), indicating the focus position (area) and photometry position as to the subject, as shown in FIG. 6 for example, is projected on the viewfinder window 10, superimposed on the subject image. The line image Gv is configured of four L-shaped lines La1 through La4 representing a wide focus frame, eight line segments Lb1 through Lb8 representing a local focus frame, a line Lc in a square shape representing a spot focus frame, and two arc-like lines Ld1 through Ld2 representing the spot photometry circle.

The imaging apparatus 1 has focus detection sensors of the AF module 20 provided at a total of nine locations corresponding to the line segments Lb1 through Lb8 indicating the local focus frame and the line Lc indicating the spot focus frame, with the subjected being focused upon using these nine focus detection sensors. In the event that the wide focus frame is selected for the focus mode, focusing is executed using sensors automatically selected from the nine focus detection sensors within the wide focus frame. Also, in the event that the photometry mode is selected with the spot photometry circle, photometry is performed only within the spot photometry circle at the center of the screen, surrounded by the arc-like lines Ld1 through Ld2.

The line image Gv such as described above is drawn by drawing the layout lines on the upper face of the focusing plate 63 configured as a transmissive member. That is to say, the line image Gv, guided to the viewfinder window 10 along with the subject light image, is represented on the focusing plate 63 provided on the optical path PA over which the subject light image which has passed through the photography lens is guided to the viewfinder window 10.

Also, the light which has passed through the main mirror 61 is reflected downwards by the sub mirror 62 and is cast into the AF module 20. The AF module 20 and the focus control unit 121 and so forth use the light from the main mirror 61 and sub mirror 62 to realize AF actions.

Composition Determining Operations with Electronic Viewfinder

Next, description will be made regarding composition determining operations using the electronic viewfinder. As shown in FIG. 5, in this case as well, the main mirror 61 and sub mirror 62 of the mirror mechanism 6 are placed on the optical path of the subject image from the photography lens unit 3. Light from the photography lens unit 3 is reflected at the main mirror 61 so that the path thereof changes upwards, is imaged on an focusing plate 63, and passes through the focusing plate 63.

What differs with the composition determining operations with the electronic viewfinder is that the light which has passed through the focusing plate 63, then further changes the path thereof at the pentaprism mirror 65, then further passes through an imaging lens 69 (imaging optical system) and is re-imaged on the imaging face of the imaging device 7 (see optical path PB in FIG. 5). The light which has been reflected off of the main mirror 61 and has changed the path thereof upwards is reflected at the roof mirror 65a and 65b and horizontally inverted, and is also vertically inverted by being reflected off of the mirror 65e and further vertically and horizontally inverted at the imaging lens 69, and it is in this state that the light image reaches the imaging device 7.

More specifically, as can be seen in comparison with FIG. 4, in FIG. 5 the angle of the mirror 65e has been changed (the angle thereof as to the camera main unit 2) has been changed. Specifically, the mirror 65e has turned on an axis AX1 the lower end side thereof by a predetermined angle α in the direction of an arrow AR1, from the state shown in FIG. 4. Note that the mirror 65e is capable of being driven so as to turn on the axis AX1 in accordance with rotation of the switchover dial 87. The central control unit 101 determines whether to perform composition determining operations using the optical viewfinder or to perform composition determining operations using the electronic viewfinder, based on detection results of an angle detector (not shown) for detecting the angle of the mirror 65e as to the axis AX1. More specifically, in the case of the mirror 65e assuming the angle shown in FIG. 4, the central control unit 101 determines to perform composition determining operations using the optical viewfinder, and performs processing to stop supply of power to the imaging device 7, turn off the display on the back monitor 12, and so forth. On the other hand, in the case of the mirror 65e assuming the angle shown in FIG. 5, the central control unit 101 determines to perform composition determining operations using the electronic viewfinder, and performs processing to supply power to the imaging device 7, turn on the display on the back monitor 12, and so forth.

Thus, changing the attitude of the mirror 65e changes the optical path of the light (observation light flux) reflected off of the mirror 65e, thereby changing the path of reflected light from the mirror 65e. Specifically, the incident angle θ1 as to the mirror 65e is relatively smaller than that of the state in FIG. 4, and the reflection angle θ2 thereof is also relatively smaller (see FIG. 5). Consequently, the reflected light from the mirror 65e changes the path thereof from the optical path heading toward the eyepiece lens 67 to a path toward the roof mirror 65a and 65b, such that the light passes through the imaging lens 69 and reaches the imaging device 7. Note that the imaging lens 69 and imaging device 7 are disposed above the eyepiece lens 67, at a position so as to not interrupt the light flux from the mirror 65e to the eyepiece lens 67 in the case of using the OVF.

Also, the path of the light flux reflected off of the mirror 65e is changed by an angle β (2×α), which is twice the change angle α of the mirror 65e. In other words, in order to change the angle of the optical path by an angle β, the mirror 65e only needs to be turned by an angle α which is half of the angle β. Also, the mirror 65e and the imaging device 7 are situated at a relatively great distance, so changing the turning angle of the mirror 65e only slightly enables two paths of reflected light from the mirror 65e to be accurately guided to the eyepiece lens 67 and the imaging device 7, which are away from each other. That is to say, the light flux of reflected light from the mirror 65e can be selectively sent along either of the two optical paths, by changing the turning angle of the mirror 65e but a little. Accordingly, space required for turning of the mirror 65e can be minimized.

The imaging device 7 generates a live view image based on the subject image which has been reflected off of the mirror 65e, passed through the imaging lens 69, and reached the imaging device 7. Specifically, multiple images are sequentially generated at minute time (e.g., 1/60 second) intervals. The acquired time-sequence images are sequentially displayed on the back monitor 12. thus, the photographer can visually recognize the moving image (live view image) displayed on the back monitor 12, and can compose the picture using the moving images. In this case as well, AF actions are realized using the light input to the AF module 20 by the main mirror 61 and sub mirror 62, as with the case of composition determining operations using the optical viewfinder.

Shaking Correction when Using Electronic Viewfinder

While the imaging apparatus 1 is capable of sensor-shift shaking correction wherein shaking correction is performed at the time of main photography by shifting the position of the imaging device 5 using the shaking correction unit 17, the shaking correction described below can be performed at the time of using the electronic viewfinder, as well.

With shaking using the electronic viewfinder, correction processing the same as with the shaking correction performed for consecutive images performed when taking moving images, for example. Specifically, a display image to be displayed on the back monitor 12 is set so as to be somewhat smaller than the image acquired with the entire imaging face of the imaging device 7 (also called "entire image"), and electronic shaking correction is performed where the position of the image which is cropped out of the entire image is adjusted as the display image, based on the shaking signals from the shaking correction sensor 15. In the event that the position of a partial image cropped out form the entire image, the center position of the entire image changes relatively as to the center of the display screen 12f, so that the display position on the display screen 12f changes for each image obtained from the imaging device 7. Such electronic shaking correction enables appropriate shaking correction in the live view display (consecutive image display).

Figure 7B:
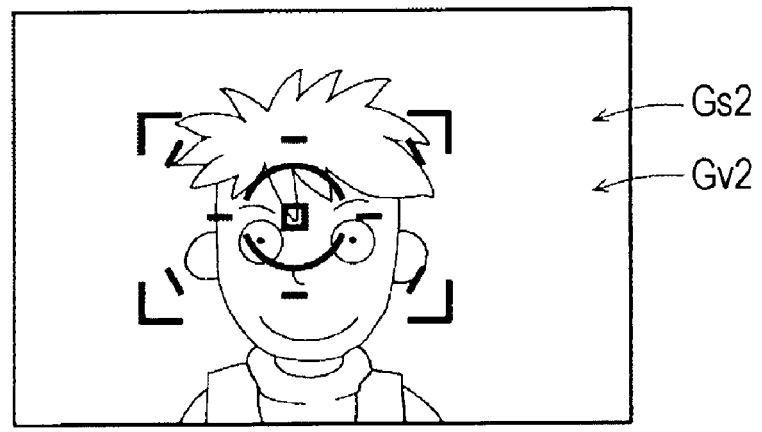

On the other hand, with the electronic viewfinder, the subject light image which has passed through the focusing plate 63 where the line image Gv shown in FIG. 6 is represented is received by the imaging device 7, so the imaging device 7 acquires an image where the line image Gv has been superimposed on the subject light image, i.e., a synthesized image. Now, performing the above electronic shaking correction causes the position of the line image Gv in the partial image to change along with the positional change in the partial image cropped out form the entire image, meaning that there is shaking of the line image Gv shown on the back monitor 12. For example in the case of the positional relation between the subject image Gs1 and line image Gv1 shown in FIG. 7A, the position of the partial image cropped out from the entire image shifts sideways in the event that sideways shaking has occurred, so while there is no positional change of the subject image such as the subject image Gs2 in FIG. 7B, the line image Gv (FIG. 6) shifts sideways as with the line image Gv1 in FIG. 7B.

Figure 7C:
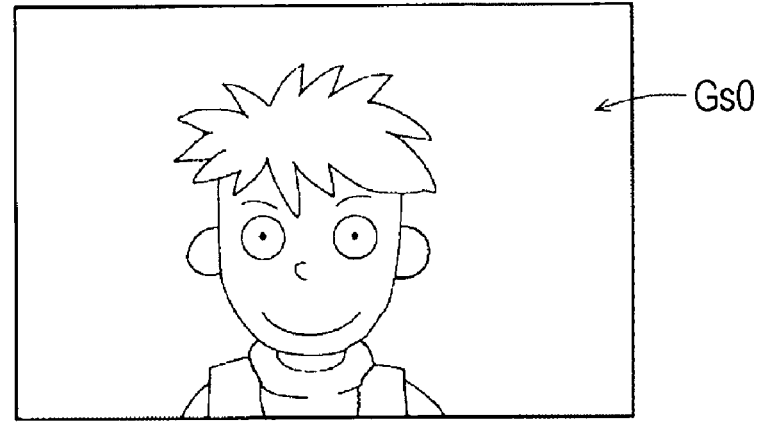

Accordingly, in the event of performing electronic shaking correction, the line image Gv (FIG. 6) acquired by the imaging device 7 is erased by performing processing the same as the correction processing (pixel interpolation processing) on missing pixels within an image obtained by an imaging device that has missing pixels in the shape of lines, with the interpolation processing circuit 55. Specifically, the synthesized image G1 shown in FIG. 7A with the line image Gv superimposed on the subject image Gs1, is subjected to interpolation processing regarding the line image Gv1 based on the pixel information of the subject image Gs1 nearby the lines (heavy lines) configuring the line image Gv (processing for supplementing the subject information lost due to superimposing of the line image Gv1), thereby generating an image Gs0 (FIG. 7C) of only the subject image, wherein the lines of the line image Gv have been erased from the synthesized image G1 by the interpolation processing circuit 55. Thus, a suitable live view image can be displayed on the back monitor 12, with the shaking of the line image Gv having been resolved.

At the time of displaying the subject image from which the line image Gv has been erased on the back monitor 12, the line image Gv shown in FIG. 6 for example can be superimposed on the subject image at a fixed position on the display screen 12f, thereby enabling display of a line image Gv which does not shake, on the back monitor 12 at the time of electronic shaking correction as well. Specifically, line images included in the line image Gv (e.g., the same lines as of the line image Gv or a part of the line image Gv) are superimposed on the images (e.g., the images Gs0 in FIG. 7C) obtained by the lines of the line image Gv (FIG. 6) having been erased from the synthesized images G1 (e.g., the synthesized images G1 in FIG. 7A) sequentially acquired by the imaging device 7, so that the display position at the display screen 12f does not change, and live view (consecutive image display) is performed. Thus, the photographer can appropriately know information for supporting photography, such as the focal position and photometry position as to the subject, from the back monitor 12.

Specific operations of the imaging apparatus 1 having the configuration such as described above will be described next.

Operations of Imaging Apparatus 1

Figure 8:
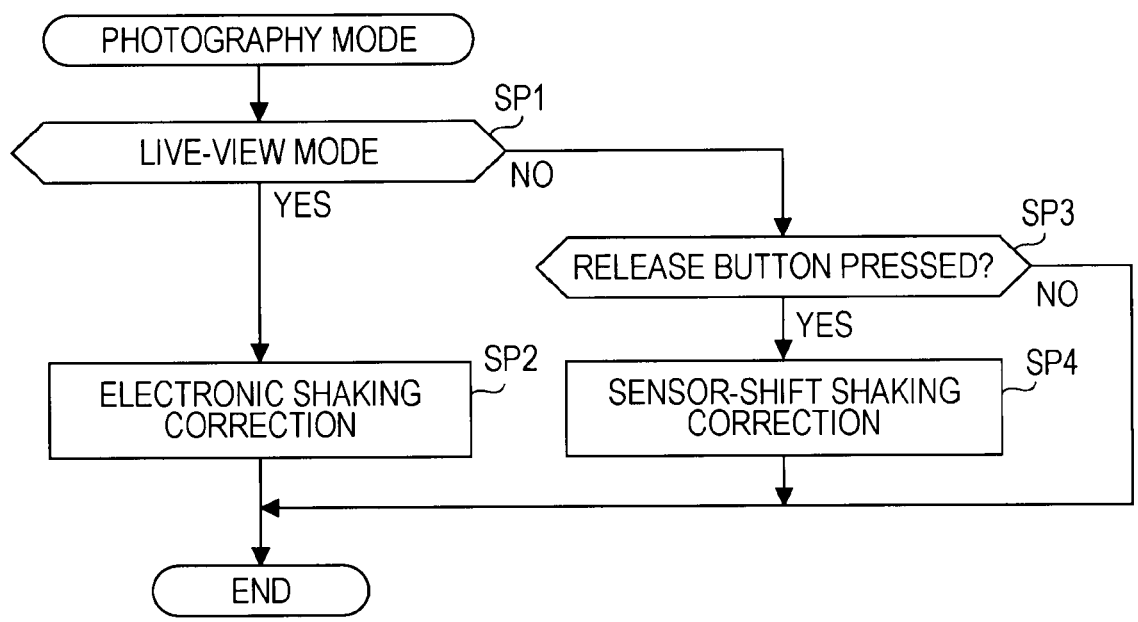
FIG. 8 is a flowchart illustrating the basic operations of the imaging apparatus 1.

FIG. 8 is a flowchart illustrating the basic operations of the imaging apparatus 1. These operations particularly deal with operations in a photography mode with the shaking correction mode set by the shaking correction switch 18, and are executed by the central control unit 101.

First, in step SP1, determination is made regarding whether the live view mode has been selected, in which the electronic viewfinder is used. Specifically, determination is made whether the mirror 65e is in the state (attitude) shown in FIG. 5 due to operations of the switchover dial 87. In the event that the live view mode has been selected, the flow proceeds to step SP2, and in the event that the live view mode has not been selected and the optical viewfinder is being used instead, the flow proceeds to step SP3.

In step SP2, the above-described electronic shaking correction using the electronic viewfinder is performed. This electronic shaking correction allows live view display with no shaking to be performed even if the hands holding the camera shake.

In step SP3, determination is made regarding whether or not the release button 11 has been pressed. Here, determination is made whether the photographer has pressed the release button all the way (S2). In the event that the release button 11 has been pressed, the flow proceeds to step SP4, and in the event that the release button 11 has not been pressed, the flow ends.

In step SP4, the above-describe sensor-shift shaking correction is performed. That is to say, mechanical shaking correction at the time of main photography is performed by shifting the imaging device 5 by the shaking correction unit 17.

The above-described operations of the imaging apparatus 1 allow for the above electronic shaking correction to be performed when using the electronic viewfinder, so appropriate shaking correction can be performed in the consecutive image display when using the electronic viewfinder.

Also, with the imaging apparatus 1, detection results of the shaking detection sensor 15 can be used with both the sensor-shift shaking correction and electronic shaking correction. Thus, the number of shaking detection sensors can be reduced, thereby reducing costs and size of the imaging apparatus.

Modifications

While a focusing plate with the line image Gv drawn thereupon is used in the above embodiment, using a focusing plate with the line image Gv drawn thereupon is not indispensable, and a focusing plate without a line image Gv may be employed. In this case, there is no line image Gv superimposed on the image acquired with the imaging device 7, so erasing processing of the line image Gv with the interpolation processing circuit 55 is unnecessary.

The line image Gv in the above embodiment does not necessarily have to be inscribed on the focusing plate 63, and may be represented on the focusing plate 63 by printing. Further, the line image Gv is not restricted to being represented on the focusing plate 63, and may be represented on a transmissive material other than the focusing plate 63 (e.g., a transparent plate).

The electronic shaking correction in the above embodiment is not restricted to using the detection results of the shaking detection sensor 15, and an arrangement may be made wherein shifting between images acquired consecutively at the imaging device 7 is detected, and the detection results thereof are used.

With the above embodiment, performing shaking correction by changing the position of the partial image cropped out form the entire image acquired by the imaging device 7 at the time of using the electronic viewfinder is not indispensable, and an arrangement may be made wherein the display range of the entire image is set so as to be somewhat small as to the entire display screen 12f for example, with the display position of the entire image being changed (shifted) as to the display screen 12f so as to perform shaking correction.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
    a first imaging sensor configured to acquire a first image relating to a subject at a time of main photography;
    a second imaging sensor configured to acquire a second image relating to the subject before the time of main photography;
    a display unit including a display screen to display an image;
    means for performing consecutive image display on the display screen, based on a plurality of the second images sequentially acquired by the second imaging sensor before the time of main photography;
    means for changing a position of the first imaging sensor;
    means for performing shaking correction at the time of main photography, by causing the means for changing the position of the first imaging sensor to change the position of the first imaging sensor; and
    a transmissive member, located on an optical path of a light image entering the imaging apparatus, to superimpose a predetermined line image on the light image before the light image reaches the second imaging sensor, wherein
    the means for performing consecutive image display further includes means for performing shaking correction of the consecutive image display, by changing a display position of the plurality of second images displayed on the display screen, and
    the means for performing shaking correction of the consecutive image display further includes means for erasing the predetermined line image from the light image that reaches the second imaging sensor.

2. The imaging apparatus according to claim 1, further comprising a shaking detection sensor configured to detect shaking of the imaging apparatus, wherein
    the means for performing shaking correction at the time of main photography is configured to use detection results of the shaking detection sensor to change the position of the first imaging sensor; and
    the means for performing shaking correction of the consecutive image display is configured to use the detection results of the shaking detection sensor to change the display position of the plurality of second images displayed on the display screen.

3. The imaging apparatus according to claim 1, further comprising means for guiding a subject light image that has passed through a photography lens to a viewfinder window along a predetermined optical path, the means for guiding including the transmissive member, provided on the predetermined optical path, upon which is represented the predetermined line image that is guided to the viewfinder window along with the subject light image, wherein
    the second imaging sensor receives a synthesized light image, wherein the subject light image has passed through the transmissive member, and the predetermined line image has been superimposed on the subject light image, and
    the means for performing shaking correction of the consecutive image display further includes means for erasing first lines defining the predetermined line image from the received synthesized light image, by subjecting the predetermined line image to interpolation processing, based on pixel information of the received synthesized light image nearby the first lines defining the predetermined line image in the received synthesized light image.

4. The imaging apparatus according to claim 3, wherein the means for performing shaking correction of the consecutive image display includes means for superimposing second lines, to reconstruct the predetermined line image, on an image obtained by the first lines defining predetermined line image having been erased from the received synthesized light image by the means for erasing, such that the consecutive image display is performed.

5. The imaging apparatus according to claim 1, wherein the means for erasing erases the predetermined line image by interpolation processing based on pixel information nearby lines defining the superimposed predetermined line image, wherein the pixel information represents the light image that reached the second imaging sensor.

6. An imaging apparatus, comprising:
    a first imaging sensor configured to acquire a first image relating to a subject at a time of main photography;
    a second imaging sensor configured to acquire a second image relating to the subject before the time of main photography;
    a display unit including a display screen to display an image;
    an electronic viewfinder unit configured to perform consecutive image display on the display screen, based on a plurality of the second images sequentially acquired by the second imaging sensor before the time of main photography;
    a position changing unit configured to change a position of the first imaging sensor;
    a sensor-shift shaking correction unit configured to perform shaking correction at the time of the main photography, by changing the position of the first imaging sensor with the position changing unit; and
    a transmissive member, located on an optical path of a light image entering the imaging apparatus, to superimpose a predetermined line image on the light image before the light image reaches the second imaging sensor, wherein
    the electronic viewfinder unit further includes an electronic shaking correction unit configured to
    perform shaking correction of the consecutive image display, by changing a display position of the images on the display screen, and to erase the predetermined line image from the light image that reaches the second imaging sensor.

7. The imaging apparatus according to claim 6, further comprising a shaking detection sensor configured to detect shaking of the imaging apparatus, wherein
   the sensor-shift shaking correction unit is configured to use detection results of the shaking detection sensor to change the position of the first imaging sensor; and
   the electronic shaking correction unit is configured to use the detection results of the detection sensor to change the display position of the plurality of second images displayed on the display screen.

8. The imaging apparatus according to claim 6, further comprising an optical viewfinder configured to guide a subject light image that has passed through a photography lens to a viewfinder window along a predetermined optical path, including the transmissive member, provided on the predetermined optical path, upon which is represented the predetermined line image, which is guided to the viewfinder window along with the subject light image, wherein
   the second imaging sensor receives a synthesized light image, wherein the subject light image which has passed through the transmissive member, and the predetermined line image has been superimposed on the subject light image; and
   the electronic shaking correction unit further includes an erasing unit configured to erase first lines defining the predetermined line image from the received synthesized light image, by subjecting the predetermined line image to interpolation processing, based on pixel information of the received synthesized light image nearby the first lines defining the predetermined line image in the synthesized light image.

9. The imaging apparatus according to claim 8, wherein the electronic shaking correction unit is configured to superimpose second lines, to reconstruct the predetermined line image, on an image obtained by the first lines defining the predetermined line image having been erased from the received synthesized light image by the erasing unit, such that the consecutive image display is performed.

10. An imaging apparatus, comprising:
   a first imaging sensor configured to acquire a first image relating to a subject at a time of main photography;
   a second imaging sensor configured to acquire a second image relating to the subject before the time of main photography;
   a display unit including a display screen to display an image;
   an electronic viewfinder unit configured to perform consecutive image display on the display screen, based on a plurality of the second images sequentially acquired by the second imaging sensor before the time of main photography;
   a position changing unit configured to change a position of the first imaging sensor;
   a sensor-shift shaking correction unit configured to perform shaking correction at the time of main photography, by changing the position of the first imaging sensor with the position changing unit; and
   an optical viewfinder unit configured to guide a subject light image that has passed through a photography lens to a viewfinder window along a predetermined optical path, the optical viewfinder unit including a transmissive member, provided on the predetermined optical path, upon which is represented a predetermined line image that is guided to the viewfinder window along with the subject light image, wherein
   the electronic viewfinder unit includes an electronic shaking correction unit configured to perform shaking correction of the consecutive image display, by changing a display position of the plurality of second images displayed on the display screen,
   the second imaging sensor receives a synthesized light image, wherein the subject light image has passed through the transmissive member, and the predetermined line image has been superimposed on the subject light image, and
   the electronic shaking correction unit further includes an erasing unit configured to erase the predetermined line image from the received synthesized light image, by subjecting the predetermined line image to interpolation processing, based on pixel information of the received synthesized light image nearby lines defining the predetermined line image in the received synthesized light image.

* * * * *